United States Patent [19]

Keller

[11] 4,198,220

[45] Apr. 15, 1980

[54] SCREENING MEMBER FOR SEPARATING SOLIDS FROM GASEOUS MEDIA

[75] Inventor: Herbert Keller, Mülheim, Fed. Rep. of Germany

[73] Assignee: Kraftwerk Union Aktiengesellschaft, Mülheim, Fed. Rep. of Germany

[21] Appl. No.: 887,253

[22] Filed: Mar. 16, 1978

[30] Foreign Application Priority Data

Mar. 31, 1977 [DE] Fed. Rep. of Germany ....... 2714496

[51] Int. Cl.² ............................................. B01D 45/06
[52] U.S. Cl. ................................ 55/442; 55/DIG. 37
[58] Field of Search ................. 55/308, 397, 398, 429, 55/436, 440, 442–446, DIG. 23, DIG. 37

[56] References Cited

U.S. PATENT DOCUMENTS 3,960,256  6/1976  Andrews ................................ 55/444

FOREIGN PATENT DOCUMENTS 1444479  11/1968  Fed. Rep. of Germany ............. 55/442
2352335   4/1975  Fed. Rep. of Germany ............. 55/308
2623133  12/1976  Fed. Rep. of Germany ............. 55/308

*Primary Examiner*—David L. Lacey
*Attorney, Agent, or Firm*—Herbert L. Lerner

[57] ABSTRACT

A cone-shaped screening member for separating solids from a gaseous medium such as steam flowing through a pipe line. The cone shaped member has a plurality of spaced annular screen elements of increasing diameters disposed behind each other with the cross section of each screen element shaped substantially as an obtuse triangle. Particular features of the screening member are, (a) inclining the outer triangle side of the screen element at about the inclination angle of the cone, and
(b) providing a discharge opening in the pipe line at about the base of the cone for removal of separated solids. This prevents settling and clogging of the gas passage canals and also prevents accumulation of settled solids in the pipe.

7 Claims, 4 Drawing Figures

U.S. Patent   Apr. 15, 1980   4,198,220
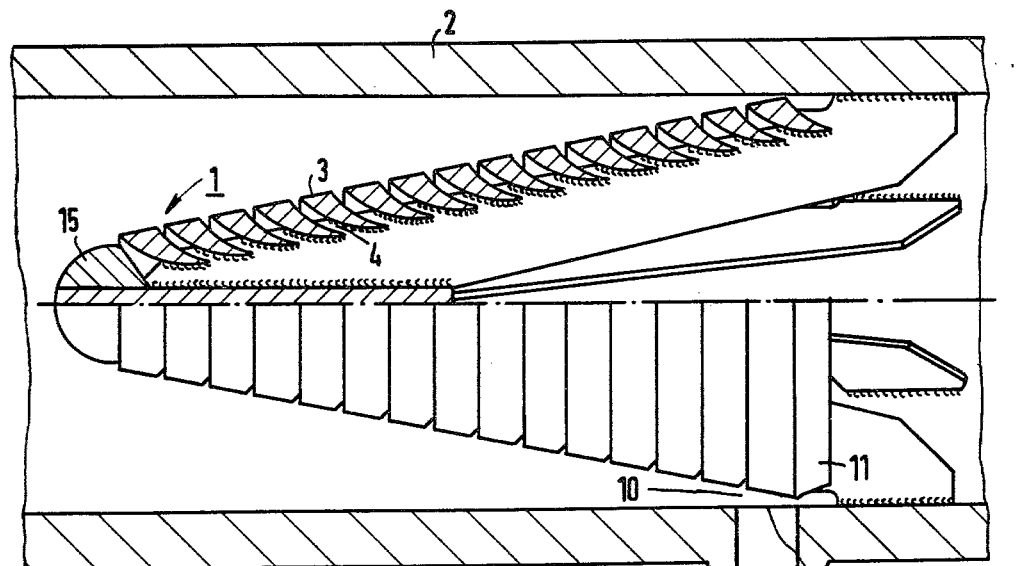
Fig.1
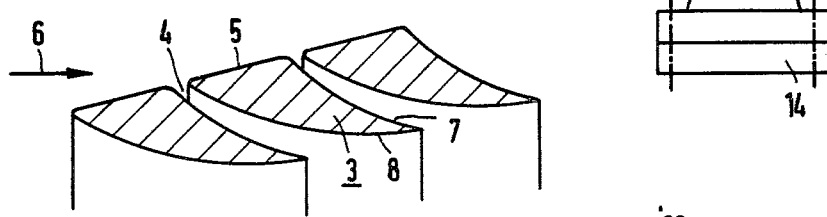
Fig.2
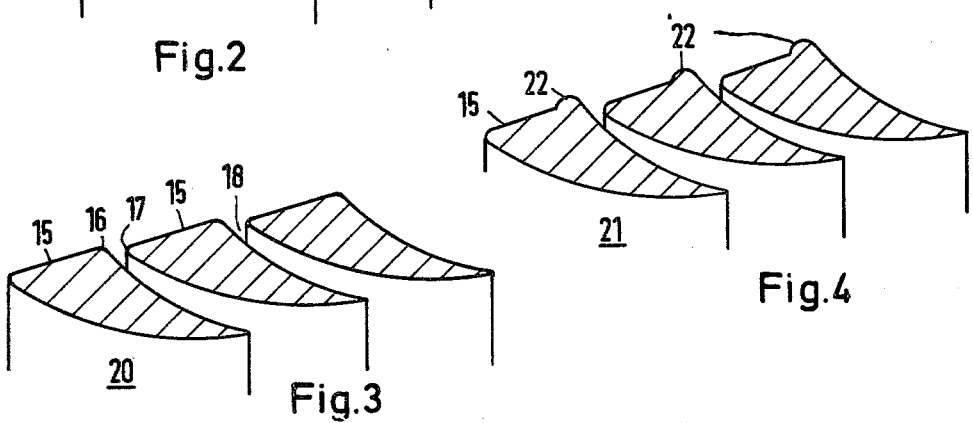
Fig.3
Fig.4

SCREENING MEMBER FOR SEPARATING SOLIDS FROM GASEOUS MEDIA

BACKGROUND OF THE INVENTION

1. Field of the Invention

This invention relates to a screening member for separating solids from gaseous flowing media, especially steam, and more particularly refers to a new and improved cone-shaped screening member having a plurality of spaced annular screen elements disposed behind each other with the cross section of each element shaped as an obtuse triangle.

2. Description of the Prior Art

U.S. Pat. No. 3,958,966 discloses a screening member for separting solids from flowing gaseous media, especially steam, wherein the screening member is of conical shape and is built into a pipe line with its apex pointing against the flow direction. The screening member consists of screen elements having approximately the cross section of an obtuse triangle. The screen elements are arranged staggered one behind the other and with a diameter increasing from stage to stage, and two screen elements each define a flow channel which gradually changes into an outflow direction parallel to the oncoming flow direction.

In this screening member, the outer triangle sides of the individual elements are parallel to the direction of the oncoming steam flow. While this arrangement and design of the individual screen elements causes solids appreciably larger than the flow channel entrance to be held back reliably, there is danger that solid foreign bodies, which are only slightly larger than the narrowest cross section of the passage openings of the screen, would settle in the convergent part of the passage canal. This, among other things, may require cleaning the screen. In this event, the entire screen must be disassembled or must be made accessible from the outside, which is a time-consuming arduous procedure requiring generally shut down of the steam pipe.

SUMMARY OF THE INVENTION

An object of the present invention is to provide a screening member, in which to the contrary, settling of foreign bodies in the passage canals is largely prevented and in which, furthermore, it is easy to remove separated solids.

With the foregoing and other objects in view there is provided in accordance with the invention a cone-shaped screening member for separating solids from a gaseous medium flowing through an elongated conduit with the apex of the cone member against the flow direction of the gaseous medium in the conduit, the cone member having a plurality of annular screen elements disposed behind each other from the apex to the base of the cone member, of increasing diameters, with the cross section of each annular screen element being shaped substantially as an obtuse triangle with an outer triangle side, one of the other sides of each of the two mutually adjacent annular screen elements defining therebetween a flow channel which is first inclined at an angle to the direction of the oncoming flow of gaseous medium and then changes to an outflow direction parallel to the direction of the oncoming flow, and having (a) the outer triangle side of the screen element inclined from the flow direction of the gaseous medium at about the angle of the cone member, and (b) a discharge opening in the elongated conduit in the area of the base of the cone member for removal of solids separated from the gaseous medium.

Other features which are considered as characteristic for the invention are set forth in the appended claims.

Although the invention is illustrated and described herein as embodied in screening member for separating solids from gaseous media, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which:

FIG. 1 shows a longitudinal cross section through a pipe line with a built-in screening member; and FIG. 2 is an enlarged cross section through several screen elements arranged one behind the other; and FIG. 3 is a cross section through several screen elements with and angle of attack which is larger than the angle of the screen cone member; and FIG. 4 is a cross section through several screen elements with a bead-like extension at the outer trailing edge.

DETAILED DESCRIPTION OF THE INVENTION

In the screening member of the present invention, each outer triangle side of the screen elements is slightly inclined at the angle of the screening member. Also in the area of the base of the screen, a discharge opening for held-back solids is provided in the pipe line.

The inclination of the outer triangle side may deviate ±5° from the inclination angle of the screen cone member. A steeper angle provides better separation for smaller particles, but results in a higher pressure loss, while a shallower setting angle causes less pressure loss but also less separating action.

To improve the separation further, the outer triangle side may further have a bead-like extension, which flings impinging solids outward.

In order to reduce or prevent the passage of fine particles, the spacing of the individual screen elements may be decreased from stage to stage, or the last screen element at the base of the screen may be set to touch the inside wall of the pipe. If the screening member is horizontally arranged, it is advantageous to arrange the discharge opening at the lowest point of the pipe in the vicinity of the last screen element adjoining the pipe line and to connect a collecting device to the discharge opening for collecting the separated solids. This collecting device may consist of a blind pipe section with a blind flange.

With such a design and arrangement of the individual screen elements, smaller solids, which heretofore used to settle in the ring gaps between the individual screen elements, are carried along by the flow together with larger solids and arrive, due to the cooperation of flow forces and gravity, at the outlet provided at the base of the screen where they can be readily discharged.

Referring to the drawings, the design and operation of the cone-shaped screening member in accordance with the invention will now be explained in greater detail.

As can be seen from the cross section in FIG. 1, the conical screening member designated generally by the numeral 1 is built, with its apex facing against the flow direction, directly into an elongated conduit or main steam line 2. The screening member 1 consists of individual screen elements 3 which are arranged staggered inclined, one behind the other, and spaced from each other, so that between each two annular screen elements 3 a flow channel 4 is formed.

As will be seen from the cross section through three parallel screen elements 3 in FIG. 2, each screen element has approximately the cross section of an obtuse triangle. These screen elements are arranged in such a manner that the respective outer triangle side 5 is inclined at a slight angle to the direction 6 of the oncoming flow. In the embodiment shown, this angle is approximately equal to the angle of the screen cone member. Of the surfaces of the screen elements 3 on the outflow side, the upper side 7 curvature is concave and the lower side 8 curvature is convex, so that the screen slot 4 becomes a discharge canal which expands in the manner of a Venturi tube. By virtue of the inclined arrangement of the triangle sides 5 of the screen elements 3, foreign bodies which are only slightly larger than the narrowest cross section between two adjacent screen elements, do not get stuck in the convergent part of the passage canal. They are rather carried along by the flow together with larger foreign particles and ultimately arrive, through cooperation of the flow forces and gravity forces, at the ring gap of screen element 11, where at the lowest point of the pipe 2 an outlet opening 12 is provided. The foreign bodies separated on the surface of the screen may be discharged through outlet opening 12. To this discharge opening 12, a collecting tank for the separated solid particles can be connected which is emptied when full. If only few foreign bodies are present, as is generally the case in steam lines of steam turbines, it is sufficient, as also shown in the drawing, to connect to this discharge opening 12 a section 13 of pipe with a blind flange 14 to close off the pipe section, so that the foreign bodies collect in this pipe section 13 and can be removed by opening the blind flange 14.

In addition, in order to prevent solid particles with diameters smaller than the gap widths between the individual screen elements from passing through the screening member, it is advantageous to choose a design of the screen elements such as is shown in FIG. 3. Here, the outer triangle sides 15 are inclined more than the inclination angle of the screen cone member. The inclination angle of a cone is the slant height of the cone relative to the altitude of the cone. The difference in inclination angle of the outer triangle side from the inclination angle of the screen cone member should, for good operation, not be more than 5°. By inclining the outer triangle sides 15, the outer trailing edge 16 of one screen element 20 lies on a larger diameter than the leading edge 17 of the following screen element, The solid particles are thereby not carried directly into the screen gap 18 but pass onto the next outer screen surface and are finally carried to the screen base 10 and the discharge opening 12.

In FIG. 4, a further means of effecting improved separation is shown. The individual screen elements 21 have a bead-like extension 22 at the trailing end of the outer triangle side 15. This flings the solid particles impinging on the outer surface 15 radially outward and the flow carries them to the base 10 of the screen.

In FIG. 1, the last screen element 11 is arranged with a spacing from the wall of the pipe 2, i.e., between the last screen element 11 and the pipe wall 2 there is a gap of the size of the spacing 4 of two screen elements 3. However, with the screen elements 20 or 21 designed according to FIG. 3 or 4, respectively, it may be desired to also prevent separated solid particles with a diameter smaller than the gap width 18 from flowing off through the ring gap at the screen element 11. This may be accomplished by reducing the width of this gap or making this gap zero, so that the last screen element 11 terminates at the wall of the pipe 2; this, however, is not shown in the drawing.

In addition, the spacing of the individual screen elements 3 can be different, while retaining an approximately equally high degree of separation for small solid particles. However, for the purpose of reducing the pressure drop, spacing of the screen elements is largest at the apex of the screen and decreases with increasing diameter of the screen elements.

The advantage of the screen design in combination with that of the discharge opening according to the invention is in substance that an arrangement for removing the screening member for cleaning can be dispensed with, as foreign bodies present are immediately conducted into a dead space. This avoids the danger that such foreign bodies might be whirled around at the screening member until they are finally broken up and, after possibly damaging the screen, get into the turbine and cause damage there.

There is claimed:

1. A cone-shaped screening member having an apex and a base and an inclination angle disposed in an elongated conduit having a gas inlet and a gas outlet, for separating solids from a gaseous medium flowing through the elongated conduit from said gas inlet to said gas outlet, said cone-shaped member positioned in the conduit such that the apex of the cone member is a shorter distance to the gas inlet of the conduit than the base of the cone and conversely the base is a shorter distance to the gas outlet than the apex, the cone-shaped member having a plurality of annular screen elements of increasing diameters disposed behind each other from the apex to the base of the cone shaped member, with the cross section of each annular screen element being shaped substantially as an obtuse triangle with an outer triangle side having a leading edge and a trailing end, one of the other sides of each of two mutually adjacent annular screen elements defining therebetween a flow channel which is first inclined at an angle to the direction of the oncoming flow of gaseous medium and then changes to an outflow direction parallel to the direction of the oncoming flow, said outer triangle side of each of said screen elements being inclined from the flow direction of the gaseous medium at about the inclination angle of said cone shaped member, the combination therewith of a discharge opening in said elongated conduit positioned at about the base of the cone-shaped member for removal of solids separated from the gaseous medium.

2. Screening member according to claim 1, wherein the inclination of the outer triangle side deviates within the range of ±° from the inclination angle of the shaped member cone.

3. Screening member according to claim 1, wherein the outer triangle side has a bead-like extension at the trailing end.

4. Screening member according to claim 1, wherein the spacing of the individual screen elements is decreased in the direction of increasing diameters of said screen elements.

5. Screening member according to claim 1, wherein the last of said plurality of screen elements touches the base of the screen member at the inside wall of the elongated conduit.

6. Screening member according to claim 1, wherein the cone-shaped member is horizontally disposed, the discharge opening is arranged in the lowest point of the conduit in the vicinity of the last of said plurality of screen elements adjacent to the conduit and a collecting device for separated solids is connected to the discharge opening.

7. Screening device according to claim 6, wherein the collecting device consists of a pipe section closed off with a flange.

* * * * *